(12) United States Patent
Lehr et al.

(10) Patent No.: US 10,738,600 B2
(45) Date of Patent: Aug. 11, 2020

(54) ONE RUN RESERVOIR EVALUATION AND STIMULATION WHILE DRILLING

(71) Applicants: Joerg Lehr, Celle (DE); Harald Grimmer, Lachendorf (DE); Stefan Wessling, Hannover (DE)

(72) Inventors: Joerg Lehr, Celle (DE); Harald Grimmer, Lachendorf (DE); Stefan Wessling, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 377 days.

(21) Appl. No.: 15/600,126

(22) Filed: May 19, 2017

(65) Prior Publication Data

US 2018/0334903 A1    Nov. 22, 2018

(51) Int. Cl.
| | |
|---|---|
| *E21B 49/00* | (2006.01) |
| *E21B 47/06* | (2012.01) |
| *E21B 33/12* | (2006.01) |
| *G05B 13/02* | (2006.01) |

(52) U.S. Cl.
CPC .......... *E21B 49/006* (2013.01); *E21B 33/12* (2013.01); *E21B 47/06* (2013.01); *G05B 13/02* (2013.01)

(58) Field of Classification Search
CPC ........ E21B 49/006; E21B 33/12; E21B 47/06; G05B 13/02
See application file for complete search history.

(56) References Cited

U.S. PATENT DOCUMENTS

| | | | |
|---|---|---|---|
| 3,050,122 A | | 8/1962 | Huitt et al. |
| 3,786,858 A | * | 1/1974 | Potter ............ F24D 12/00 165/45 |

(Continued)

FOREIGN PATENT DOCUMENTS

| | | |
|---|---|---|
| GB | 1429800 A | 3/1976 |
| GB | 2257448 A | 1/1993 |

(Continued)

OTHER PUBLICATIONS

PetroWiki. Apr. 24, 2012 <https://petrowiki.org/File:Devol2_1102final_Page_050_Image_0001.png> (Year: 2012).*

(Continued)

*Primary Examiner* — Jonathan M Dunlap
(74) *Attorney, Agent, or Firm* — Cantor Colburn LLP

(57) ABSTRACT

A method for drilling a borehole penetrating an earth formation includes: drilling a first section of the borehole; notching a wall of the borehole in one or more selected locations with a selected type of notch using a notcher for defined local weakening of the formation; performing a local induced break-out test and/or local fracturing operation on an annulus section of the first section of the borehole between the drill string and a wall of the borehole using a test tool comprising a packer to provide formation stress-state data. The one or more locations is based on the formation stress-state data. The method further includes deriving stress-state of the formation and a fracturing parameter of the formation using the formation stress-state data and drilling a second section of the borehole using the derived stress-state and the fracturing parameter.

27 Claims, 14 Drawing Sheets

(56) References Cited

U.S. PATENT DOCUMENTS

| | | | | |
|---|---|---|---|---|
| 3,878,884 | A * | 4/1975 | Raleigh | E21B 43/17 165/45 |
| 3,961,524 | A | 6/1976 | De La Cruz | |
| 4,149,409 | A | 4/1979 | Serata | |
| 4,733,567 | A | 3/1988 | Serata | |
| 4,779,681 | A * | 10/1988 | York | E21B 33/1291 166/100 |
| 4,899,320 | A | 2/1990 | Hearn et al. | |
| 4,974,675 | A * | 12/1990 | Austin | E21B 43/26 166/250.1 |
| 5,236,040 | A * | 8/1993 | Venditto | E21B 43/26 166/250.1 |
| 5,337,821 | A | 4/1994 | Peterson | |
| 5,335,724 | A * | 8/1994 | Venditto | E21B 23/006 166/250.1 |
| 5,353,637 | A * | 10/1994 | Plumb | E21B 49/008 166/101 |
| 5,472,049 | A * | 12/1995 | Chaffee | E21B 7/18 166/177.5 |
| 5,517,854 | A | 5/1996 | Plumb et al. | |
| 5,799,733 | A * | 9/1998 | Ringgenberg | E21B 21/103 166/264 |
| 6,179,069 | B1 * | 1/2001 | Zheng | E21B 21/00 166/308.1 |
| 6,351,991 | B1 * | 3/2002 | Sinha | E21B 49/006 367/27 |
| 6,414,905 | B1 | 7/2002 | Owens et al. | |
| 6,588,266 | B2 | 7/2003 | Tubel et al. | |
| 7,042,802 | B2 * | 5/2006 | Sinha | G01V 1/50 367/25 |
| 7,054,750 | B2 * | 5/2006 | Rodney | E21B 7/04 702/9 |
| 7,165,616 | B2 * | 1/2007 | Jorgensen | E21B 43/26 166/250.1 |
| 7,424,912 | B2 * | 9/2008 | Reid | E21B 17/1021 166/223 |
| 7,445,043 | B2 | 11/2008 | Mullins et al. | |
| 7,644,761 | B1 * | 1/2010 | Gu | E21B 43/267 166/280.1 |
| 8,024,124 | B2 * | 9/2011 | Sayers | G01V 1/30 702/11 |
| 8,060,311 | B2 | 11/2011 | Ramshaw et al. | |
| 8,061,444 | B2 | 11/2011 | Mullins et al. | |
| 8,091,634 | B2 | 1/2012 | Corre et al. | |
| 8,146,416 | B2 | 4/2012 | Pisio et al. | |
| 8,151,886 | B2 | 4/2012 | Xu et al. | |
| 8,220,536 | B2 | 7/2012 | Tao et al. | |
| 8,616,277 | B2 | 12/2013 | Backhaus et al. | |
| 8,663,401 | B2 | 3/2014 | Marya et al. | |
| 8,708,066 | B2 | 4/2014 | Orban et al. | |
| 8,789,587 | B2 | 7/2014 | Tubel et al. | |
| 8,831,923 | B2 * | 9/2014 | Lei | G01V 1/48 703/10 |
| 8,899,349 | B2 | 12/2014 | Rasmus et al. | |
| 8,952,829 | B2 * | 2/2015 | Wessling | E21B 47/0002 166/250.01 |
| 9,033,045 | B2 | 5/2015 | Fincher | |
| 9,404,356 | B2 | 8/2016 | Benson et al. | |
| 9,416,594 | B2 | 8/2016 | Jeffryes et al. | |
| 9,646,115 | B2 * | 5/2017 | Frydman | G06F 17/5009 |
| 9,835,746 | B2 * | 12/2017 | Yan | G01V 1/282 |
| 2003/0205083 | A1 | 11/2003 | Tubel et al. | |
| 2008/0156535 | A1 * | 7/2008 | Reid | E21B 17/1021 175/50 |
| 2009/0188665 | A1 | 7/2009 | Tubel et al. | |
| 2009/0266548 | A1 * | 10/2009 | Olsen | E21B 43/26 166/308.1 |
| 2010/0032158 | A1 | 2/2010 | Dale et al. | |
| 2010/0243242 | A1 * | 9/2010 | Boney | E21B 43/025 166/250.01 |
| 2010/0250214 | A1 * | 9/2010 | Prioul | G01V 1/48 703/10 |
| 2011/0077920 | A1 * | 3/2011 | Lei | G01V 1/48 703/2 |
| 2011/0132609 | A1 * | 6/2011 | Van Hal | E21B 36/008 166/300 |
| 2011/0132663 | A1 * | 6/2011 | Johnston | E21B 49/005 175/24 |
| 2011/0153296 | A1 * | 6/2011 | Sadlier | E21B 44/00 703/7 |
| 2011/0182144 | A1 * | 7/2011 | Gray | G01V 1/30 367/75 |
| 2011/0308803 | A1 | 12/2011 | O'Connell et al. | |
| 2012/0188090 | A1 * | 7/2012 | Wessling | E21B 47/0002 340/853.1 |
| 2013/0199787 | A1 * | 8/2013 | Dale | E21B 43/26 166/302 |
| 2013/0240211 | A1 * | 9/2013 | East | E21B 43/26 166/308.1 |
| 2013/0275099 | A1 * | 10/2013 | Frydman | G06F 17/5009 703/2 |
| 2014/0069653 | A1 * | 3/2014 | Liu | E21B 49/006 166/308.1 |
| 2014/0214325 | A1 * | 7/2014 | Wessling | E21B 47/06 702/11 |
| 2015/0027724 | A1 | 1/2015 | Symms | |
| 2015/0055438 | A1 * | 2/2015 | Yan | G01V 1/282 367/73 |
| 2015/0160365 | A1 | 6/2015 | Donderici et al. | |
| 2015/0337599 | A1 | 11/2015 | Bullock | |
| 2016/0034818 | A1 * | 2/2016 | Knecht | E21B 41/00 166/308.1 |
| 2016/0201440 | A1 * | 7/2016 | Aidagulov | E21B 43/26 166/285 |
| 2017/0254186 | A1 * | 9/2017 | Aidagulov | E21B 43/26 |
| 2018/0266183 | A1 * | 9/2018 | Ayub | E21B 43/2405 |
| 2018/0320484 | A1 * | 11/2018 | Gordeliy | E21B 43/26 |

FOREIGN PATENT DOCUMENTS

| | | |
|---|---|---|
| GB | 2362463 A | 11/2001 |
| WO | 2009086279 A2 | 7/2009 |

OTHER PUBLICATIONS

Molaghab et al. "Determination of minimum and maximum stress profiles using wellbore failure evidences: a case study—a deep oil well in the southwest of Iran" J Petrol Explor Prod Technol (2017) 7: 707-715 (Year: 2017).*

Zoback et al. "Well Bore Breakouts and in Situ Stress" Journal of Geophysical Research, vol. 90, No. B7, p. 5523-5530, Jun. 10, 1985 (Year: 1985).*

Naeimipour, Ali; "Study of Borehole Probing Methods to Improve the Ground Characterization"; (2013); Retrieved from the Internet; URL//https://etda.libraries.psu.edu/catalog/s4655g578; 213 pages.

International Search Report and the Written Opinion of the International Searching Authority; PCT/US2018/032300; dated Sep. 20, 2018; 15 pages.

* cited by examiner

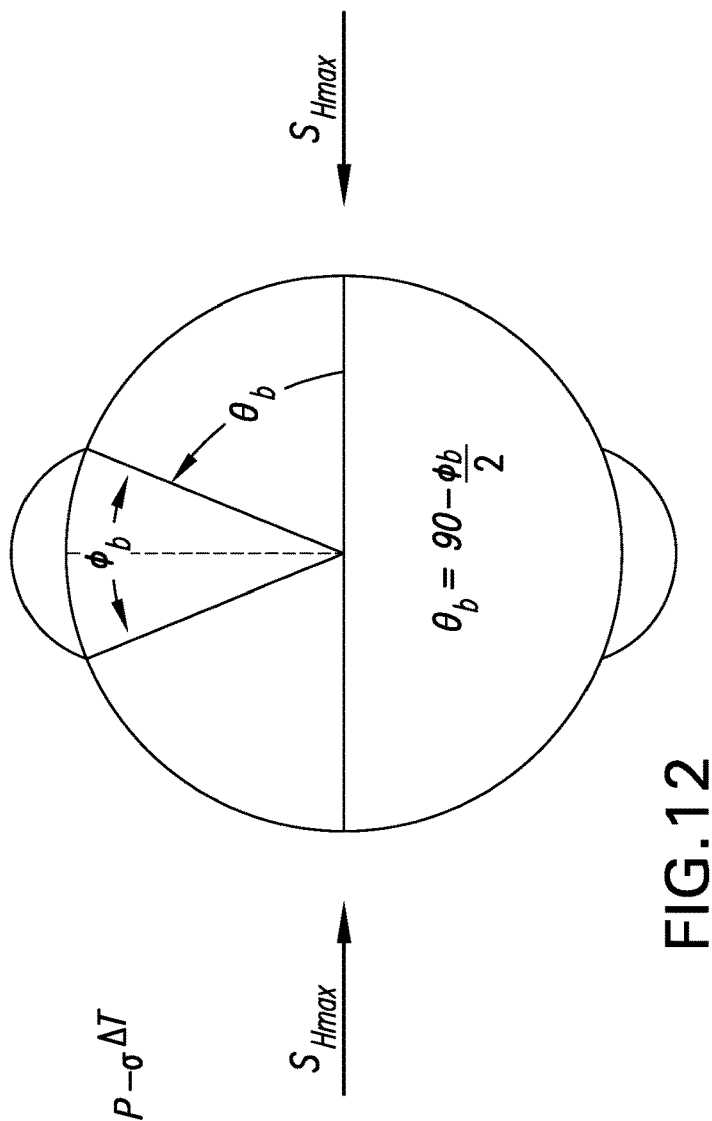

Wellbore Breakouts

$$\sigma_{\theta\theta} = S_{Hmin} - S_{Hmax} - 2(S_{Hmax} - S_{Hmin})\cos 2\theta_b - 2P_p - \Delta P - \sigma^{\Delta T} = C_{eff}$$

$$S_{Hmax} = [C_{eff} + 2P_p + \Delta P + \sigma^{\Delta T}) - S_{Hmin}(1 + 2\cos 2\theta_b)]/(1 - 2\cos 2\theta_b)$$

Tensile Fractures

$$T_o = \sigma_{\theta\theta}^{min} = 3S_{Hmin} - S_{Hmax} - 2P_p - \Delta P - \sigma^{\Delta T}$$

$$S_{Hmax} = 3S_{Hmin} - 2P_p - \Delta P - T_o - \sigma^{\Delta T}$$

$T_o$ approximately 0

FIG. 12
PRIOR ART

ONE RUN RESERVOIR EVALUATION AND STIMULATION WHILE DRILLING

BACKGROUND

Boreholes are drilled into earth formations for various purposes such as hydrocarbon production, geothermal production, and carbon dioxide sequestration. For efficient use of drilling resources, it is desired that the boreholes be drilled in a way that would minimize the possibility of their collapse or damage. In addition, it is desired to complete a wellbore by hydraulic fracturing in a way that production is maximum or improved. Determining an adequate borehole trajectory generally requires knowledge of the various stresses acting on the earth formations. Typically, a bottom hole assembly is removed from a borehole in order to conduct tests that would provide the magnitudes of the various stresses. Unfortunately, removal of the bottom hole assembly from the borehole adds considerable time necessary to drill the borehole. Consequently, it would be well received in the drilling industry if methods and systems were developed to more efficiently determine formation stresses for wellbore stability and production maximization or improvement.

BRIEF SUMMARY

Disclosed is a method for drilling a borehole penetrating an earth formation. The method includes: drilling a first section of the borehole using a drill string; notching a wall of the borehole in one or more selected locations with a selected type of notch using a notcher disposed on the drill string for defined local weakening of the formation; performing a local induced break-out test (LIBOT) and/or local fracturing operation on an annulus section of the first section of the borehole between the drill string and a wall of the borehole using a test tool having a packer to provide formation stress-state data, the test tool being disposed on the drill string and the packer being configured to isolate the annulus section; deriving stress-state of the formation and a fracturing parameter of the formation using the formation stress-state data; and drilling a second section of the borehole using the derived stress-state and the fracturing parameter; wherein the one or more selected locations is based upon the formation stress-state data.

Also disclosed is an apparatus for drilling a borehole penetrating an earth formation, the apparatus comprising: a drill string configured to drill a first section and a second section of the borehole; a notcher disposed on the drill string and configured to notch a wall of the borehole in one or more selected locations with a selected type of notch for defined local weakening of the formation; a test tool having a packer disposed on the drill string, the test tool being configured to perform a local induced break-out test (LIBOT) and/or local fracturing operation on an annulus section of the first section of the borehole between the drill string and a wall of the borehole to provide formation stress-state data, the packer being configured to isolate the annulus section; a processor configured to derive a stress-state of the formation and a fracturing parameter of the formation using the formation stress-state data; and a controller configured to control a drilling direction of the drill string for drilling the second section of the borehole in a selected direction using the derived stress-state and the fracturing parameter; wherein the one or more selected locations is based upon the formation stress-state data.

BRIEF DESCRIPTION OF THE DRAWINGS

The following descriptions should not be considered limiting in any way. With reference to the accompanying drawings, like elements are numbered alike:

FIG. 12 depicts aspects of formulas for wellbore break-outs and tensile fractures;

DETAILED DESCRIPTION

A detailed description of one or more embodiments of the disclosed apparatus and method presented herein by way of exemplification and not limitation with reference to the figures.

Disclosed are embodiments of methods and apparatuses for estimating stress parameters of an earth formation using equipment attached to a drill string that is drilling a borehole in that earth formation. The stress parameters can be estimated without removing the drill string from the borehole and can thus be estimated in one run of the drilling process. Using the estimated stress parameters, a trajectory that may include build direction for that borehole and/or drilling parameters can be determined to minimize the possibility of damage, such as by breakouts or collapse, to the borehole. In addition, hydrocarbon production may be enhanced by performing one or more operations on the borehole, such as notching the borehole wall, as the drill string is pulled out of the borehole or during drilling of a production section. Consequently, estimating drilling parameters and trajectory and performing production enhancements can be accomplished in one run of the drill string, thus improving the efficient use of resources.

Figure 1:
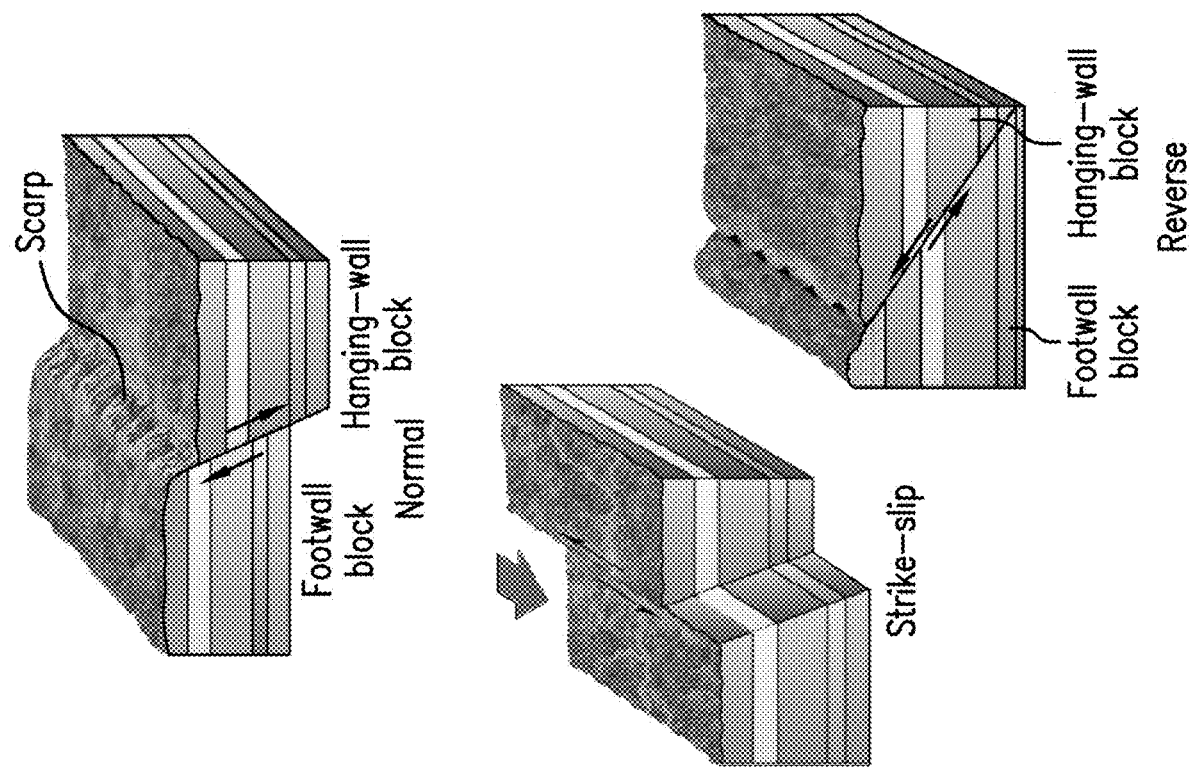
FIG. 1 depicts aspects of nomenclature used to describe principal stress distribution.

FIG. 1 depicts aspects of nomenclature used to describe principal stress distribution for normal, strike-slip and reverse faulting stress regimes. In general, the faulting stress regimes can be determined by surface analysis.

Figure 2:
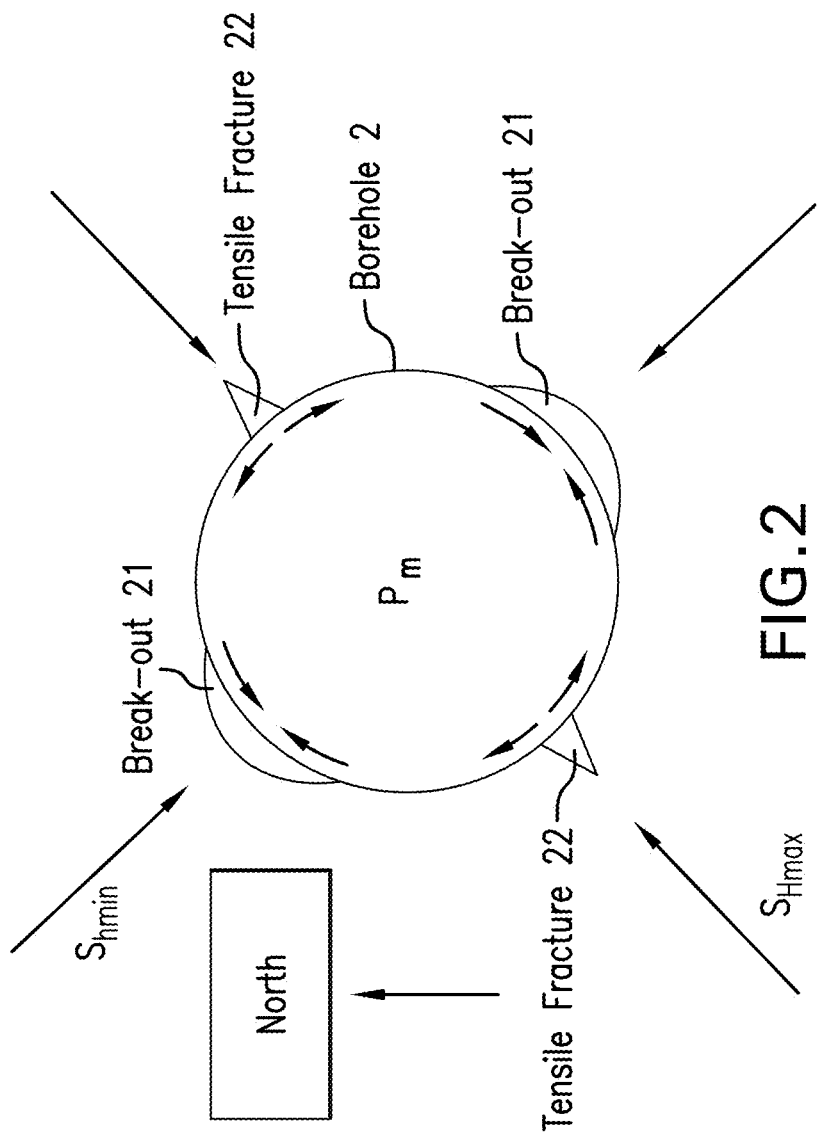
FIG. 2 depicts aspects of stress concentration in vertical boreholes.

FIG. 2 depicts aspects of stress concentration in a vertical borehole 2 (may also be referred to as a wellbore) and it is assumed for simplicity and teaching purposes that the direction of principle stresses aligns with the vertical and horizontal directions, respectively. Breakouts 21 are oriented in the direction of $S_{hmin}$. Tensile Fractures (TFs) 22 are oriented in the direction of $S_{Hmax}$. Arrows on the circumference of the borehole indicate compressive stress near the breakouts 21 and tensile stress near the TFs 22. $P_m$ represents drilling fluid or mud pressure at a certain depth. In vertical boreholes, failure is determined by the compressive and tensile rock strength of the formation rock and the re-distributed circumferential and radial stresses, which in turn depend on $S_{Hmax}$ and $S_{hmin}$. The vertical stress has no impact on borehole failure.

Figure 3A:
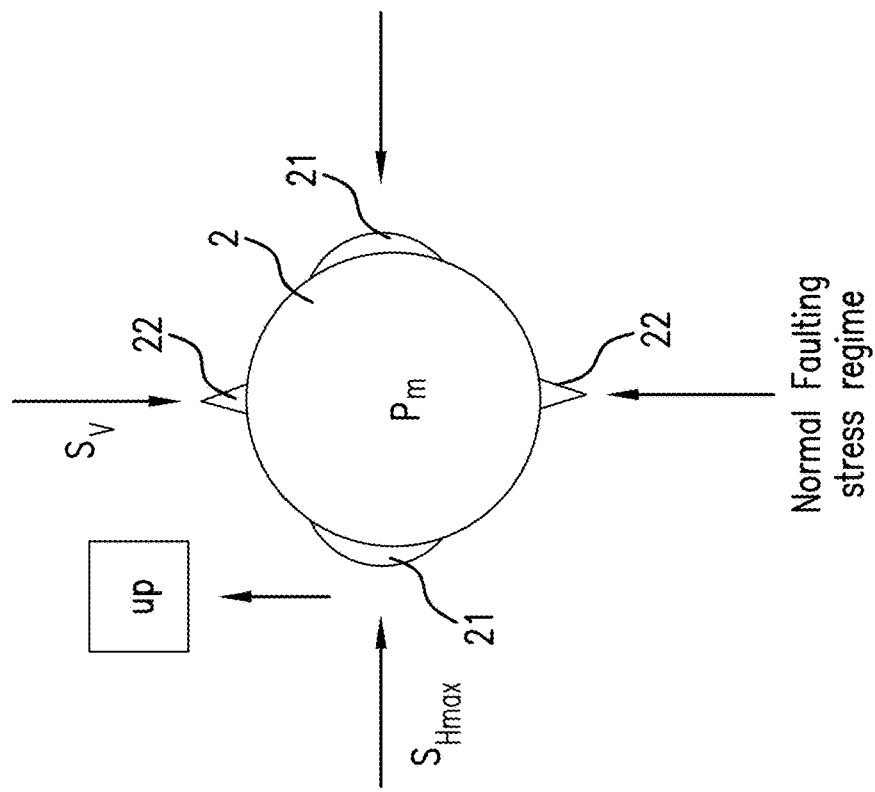
FIGS. 3A and 3B, collectively referred to as FIG. 3, depict aspects of stress concentrations in horizontal boreholes drilled in the direction of minimum horizontal stress.
Figure 3B:
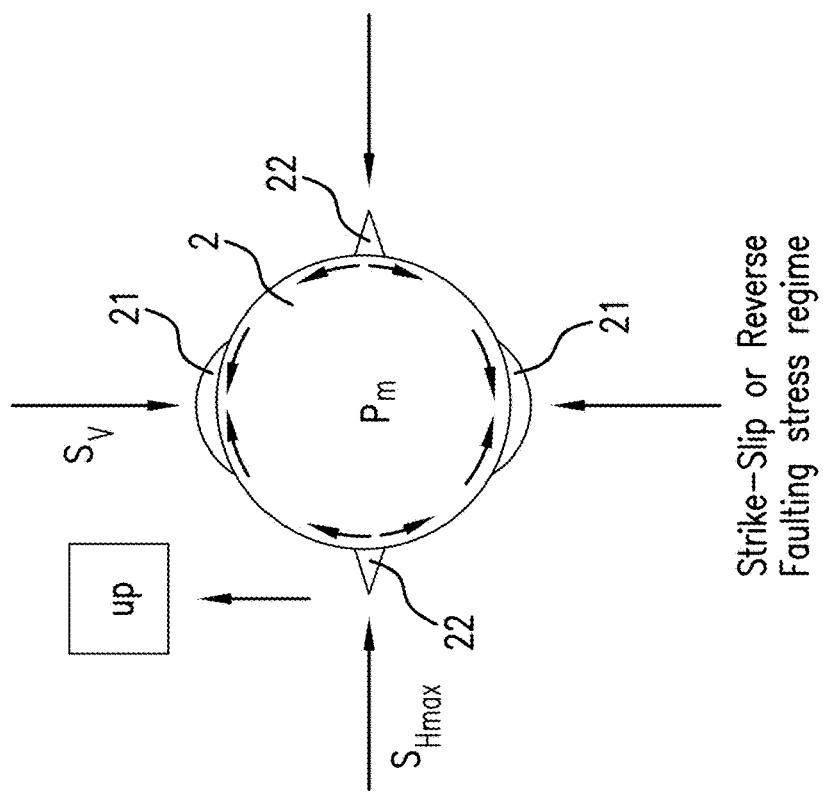

FIG. 3 depicts aspects of stress concentrations in horizontal boreholes drilled in the direction of minimum horizontal stress $S_{hmin}$. FIG. 3A illustrates the breakouts 21 and TFs 22 in a strike-slip or reverse faulting stress regime. FIG. 3B illustrates the breakouts 21 and the TFs 22 in a normal faulting stress regime. In horizontal boreholes drilled in the direction of $S_{hmin}$, failure is determined by the compressive and tensile rock strength of the formation rock and the re-distributed hoop and radial stresses, which in turn depend on $S_{Hmax}$ and $S_v$, $S_{hmin}$ has no impact of borehole failure.

Figure 4B:
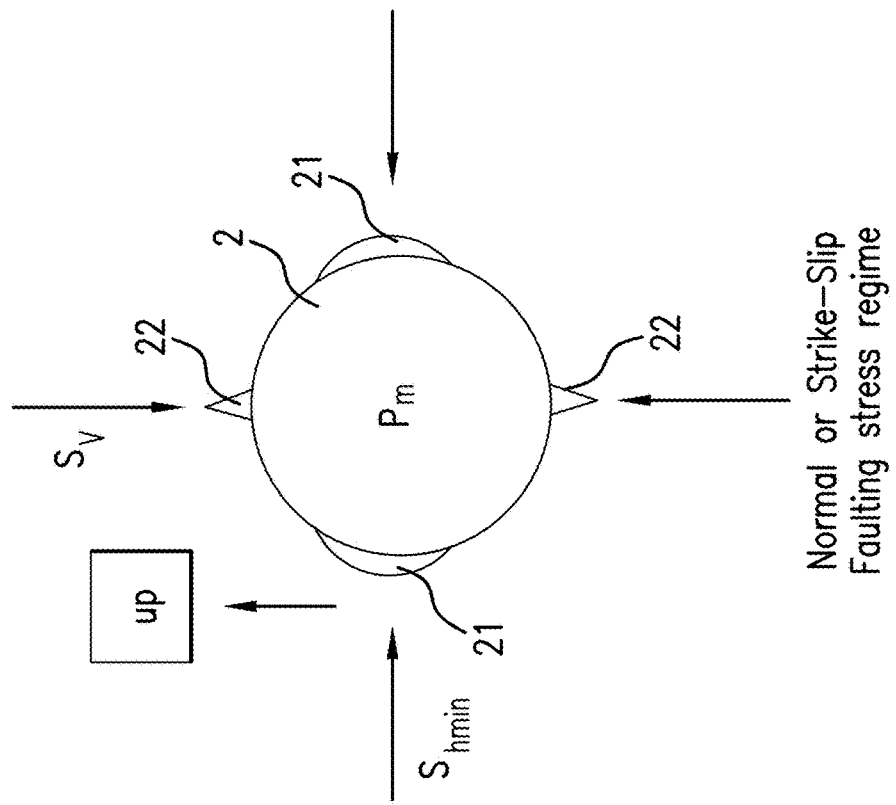
FIGS. 4A and 4B, collectively referred to as FIG. 4, depict aspects of stress concentrations in horizontal boreholes drill in the direction of maximum horizontal stress.
Figure 4A:
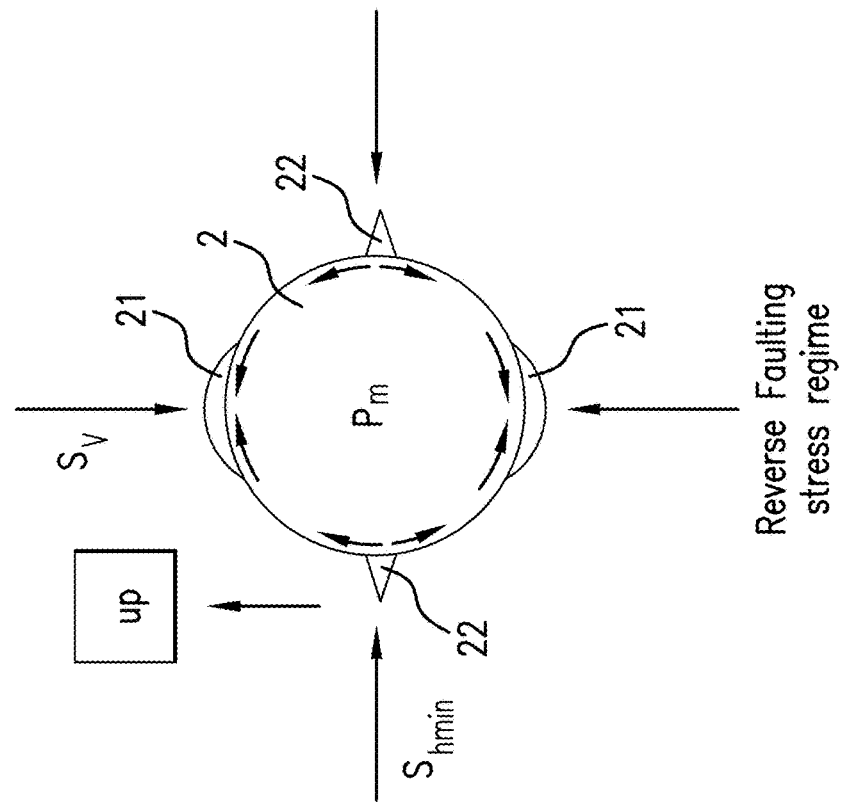

FIG. 4 depicts aspects of stress concentrations in horizontal boreholes drill in the direction of maximum horizontal stress $S_{Hmax}$. FIG. 4A illustrates the breakouts 21 and TFs 22 in a reverse faulting stress regime. FIG. 4B illustrates the breakouts 21 and the TFs 22 in a normal or strike-slip faulting stress regime. In horizontal boreholes drilled in the direction of $S_{Hmax}$, failure is determined by the compressive and tensile rock strength of the formation rock and the re-distributed circumferential and radial stresses, which in turn depend on $S_{hmin}$ and $S_v$, $S_{Hmax}$ has no impact on borehole failure.

From observation of the comparison of FIGS. 3 and 4 is the magnitude of $S_{Hmax}$ and $S_{hmin}$ on the creation of tensile fractures or breakouts can be seen. If $S_{Hmax}$ and $S_{hmin}$ are of different magnitude, the failure behavior will be different, hence defining the drilling direction into $S_{Hmax}$ or $S_{hmin}$ will affect the failure behavior.

Figure 5:
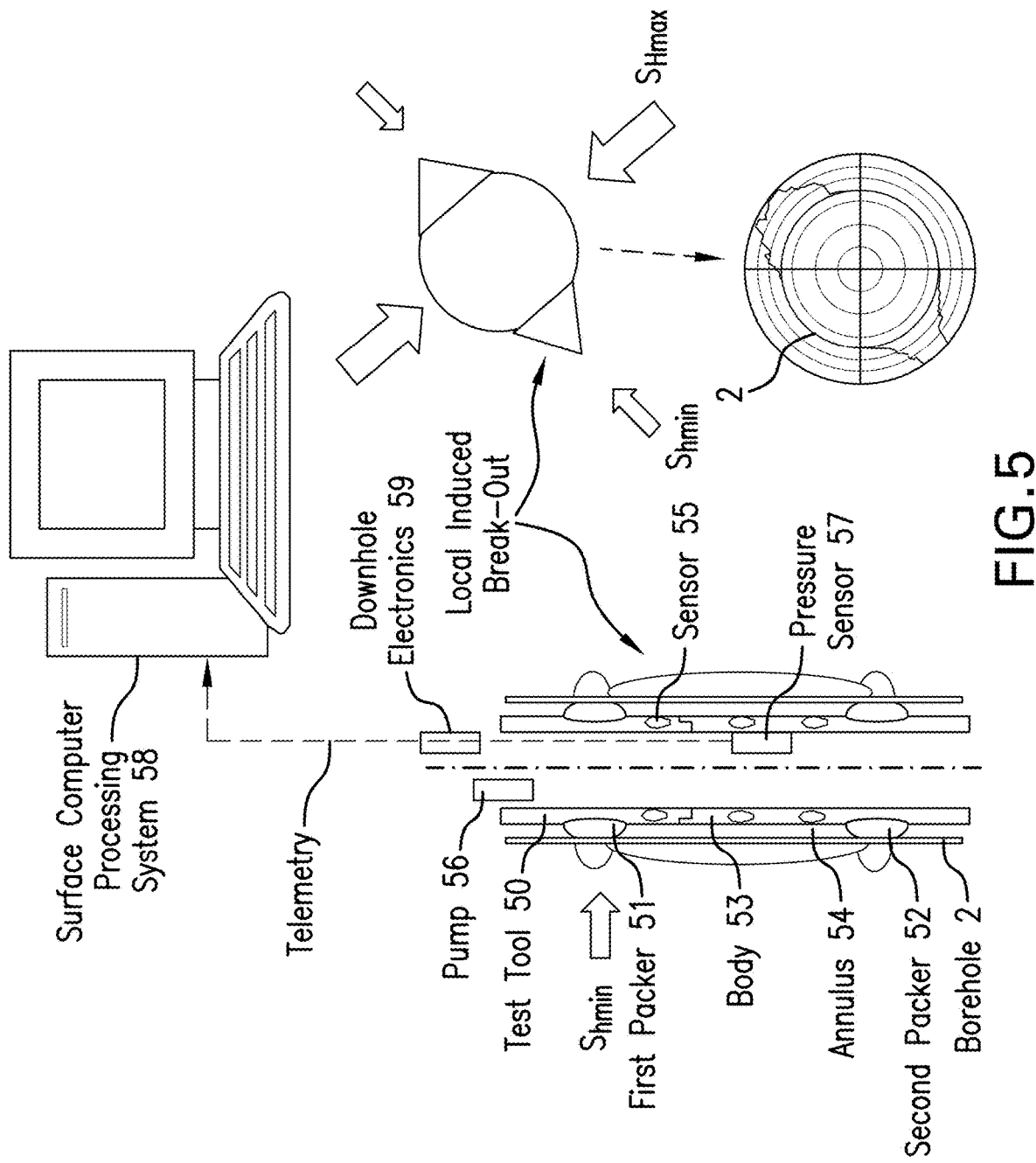
FIG. 5 depicts aspects of a local induced break-out test.

FIG. 5 depicts aspects of a local induced break-out test (LIBOT). A test tool 50 disposed in the borehole 2 is configured to conduct the LIBOT. The test tool 50 is attached to a drill string for drilling the borehole 2 and may be part of a bottomhole assembly (BHA). In the embodiment of FIG. 5, the test tool 50 includes a first packer 51 and a second packer 52. In one or more embodiments, each packer includes an elastomeric material that can be hydraulically inflated between a body 53 of the test tool 50 and a wall of the borehole 2 in order to isolate an annulus 54 between the first packer 51 and the second packer 52. After the annulus 54 is isolated, pressure in the annulus 54 is decreased and observation of break-out development is performed using one or more sensors 55 in the test tool 50. Sensors 55 may be distributed about or around the test tool 50 in order to provide 360° observation coverage around the borehole 2. Non-limiting embodiments of the sensors 55 include imaging sensors such as acoustic sensors, density sensors, gamma radiation sensors and/or resistivity sensors. Other types of sensors configured to sense the occurrence of break-outs may also be used. The pressure in the annulus 54 may be reduced by reducing the mud weight in the drill string or by using a pump 56 in fluid communication with the annulus 54. Fluid communication may be through an opening (not shown) in the tool body 53. Pressure in the annulus 54 may be sensed by a pressure sensor 57. The pressure sensor 57 may transmit pressure data to a surface computer processing system 58 using telemetry such as pulsed-mud or wired drill pipe. Similarly, data from the one or more sensors 55 may be transmitted to the surface computer processing system 58. The surface computer processing system 58 is configured to record and/or process data received from the one or more sensors 55 and/or the pressure sensor 57 in order to produce LIBOT data. Alternatively or in addition, downhole electronics 59 may record and/or process that data.

Once a break-out is observed using the one or more sensors 55, the reduction of pressure in the annulus 54 is stopped to limit damage to the borehole 2. From the break-out observation and the pressure data, the stress state and direction can be derived. For example, the width of a breakout can be measured using the one or more sensors 55. The width of a breakout depends on the relationship between the compressive rock strength and the magnitude of re-distributed stresses around the borehole, whereas the re-distributed stresses in turn depend on the pressure in the annulus 54. For a vertical well, a mathematical relationship between stresses and the breakout width $\phi_b$ is given by the formula presented in FIG. 12 with reference to the accompanying illustration. In the formula presented in FIG. 12:

$P_p$=pore pressure, MPa, psi, lbm/gal;
$S_1$=greatest principal stress, MPa, psi;
$S_3$=least principal stress, MPa, psi;
$S_{Hmin}$=least horizontal stress, MPa, psi, lbm/gal;
$S_{Hmax}$=greatest horizontal stress, MPa, psi, lbm/gal;
$\Delta P$=difference between the pressure of fluid in a well and the pore pressure;
$\Delta T$=temperature difference between the fluid in a well and the adjacent rock;
$\theta$=angle around the wellbore measured from the $S_{Hmax}$ direction, degrees;
$\mu$=coefficient of sliding friction on a pre-existing weak plane,
where $\mu$=tan $\Phi$;
$\sigma$=Terzaghi effective stress, MPa, psi;
$\sigma_1$, $\sigma_2$, =maximum, intermediate, and least effective stresses, MPa, psi; $\sigma_3$
$\sigma_{rr}$=effective normal stress acting in the radial direction, MPa, psi; and
$\sigma_{\theta\theta}$, =the effective hoop stress, MPa, psi.

Figure 6:
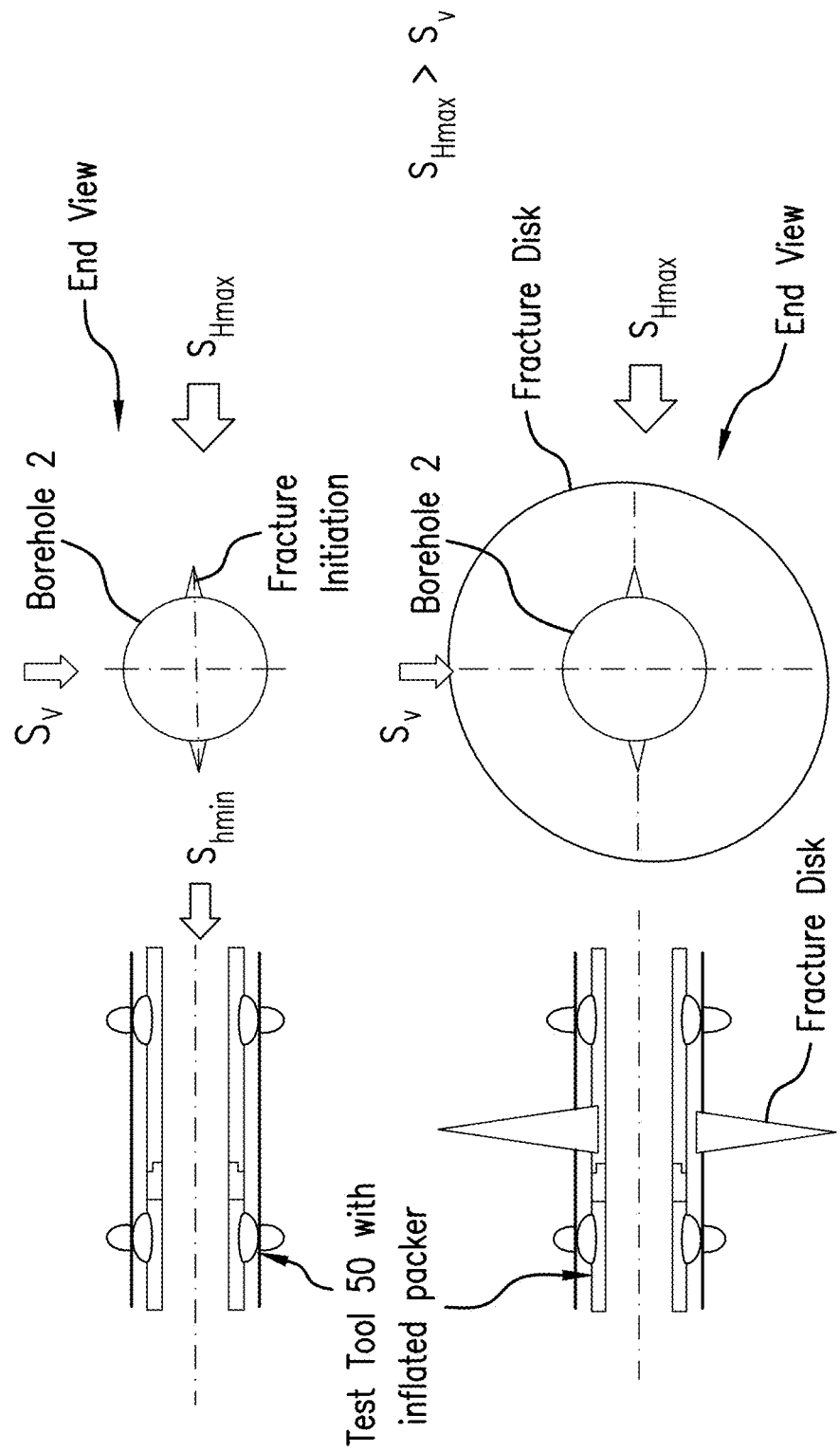
FIG. 6 depicts aspects of an in-situ pressure test and propagation of fractures in a strike-slip or reverse faulting stress regime.

FIG. 6 depicts aspects of an in-situ pressure test and propagation of fractures in a strike-slip or reverse faulting stress regime. In this in-situ pressure test, the first packer 51 and the second packer 52 are set and pressure is applied to the annulus 54 thus increasing the pressure in the annulus 54. The pump 56 may be used to apply the pressure. Fracture initiation occurs in the direction of maximum horizontal stress $S_{Hmax}$. The stress concentration at the inflated packer stops crack propagation. Fracture disk initiation and propagation occurs in the direction of $S_{Hmax}$ and $S_v$.

Figure 7:
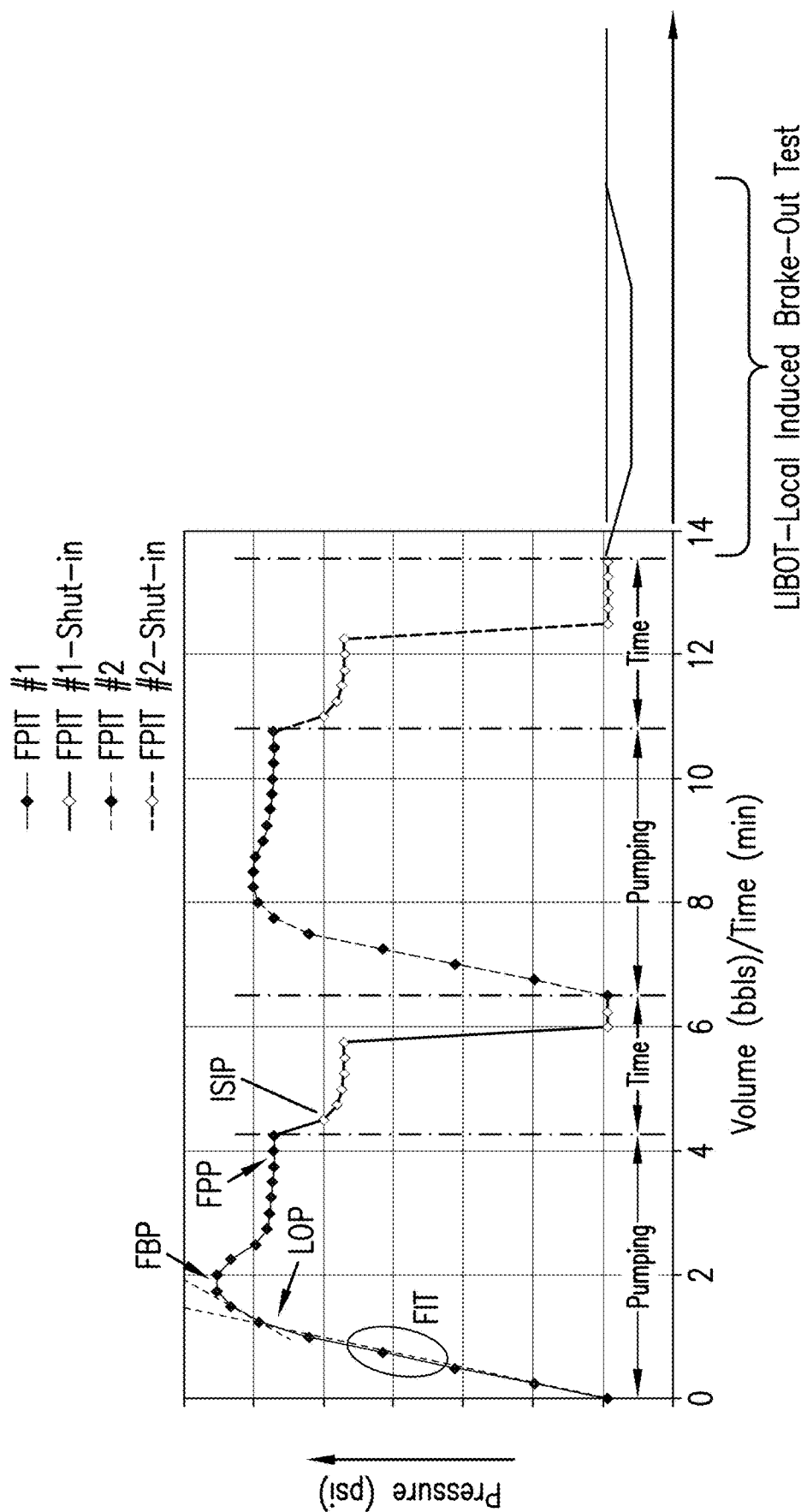
FIG. 7 depicts aspects of a formation integrity test and an induced break-out test.

FIG. 7 depicts aspects of a formation integrity test (FIT) and a LIBOT. Aspects of two formation integrity tests are illustrated along the X-axis between 0 and 14. To the right of 14 on the X-axis, aspects of the local induced break-out test are illustrated. The second FIT may be used to verify data obtained from the first FIT. LOP refers to Leak-Off Pressure. LOP is the pressure at which fluid in the borehole starts to leak into the formation. FBP is the Formation Breakdown Pressure. FBP is the pressure at which the formation fractures thus preventing an increase in pressure. FPP is the Fracture Propagation Pressure. FPP is the pressure that is maintained as fluid propagates into fractures and propagates the fracture further into the formation. ISIP is the Instantaneous Shut-In Pressure. ISIP is the pressure at which the fracture surfaces will start to touch. The ISIP is in this kind of test the pressure of the minimum principle stress. During the LIBOT, the pressure in the isolated annulus is decreased as illustrated in FIG. 7.

Figure 8:
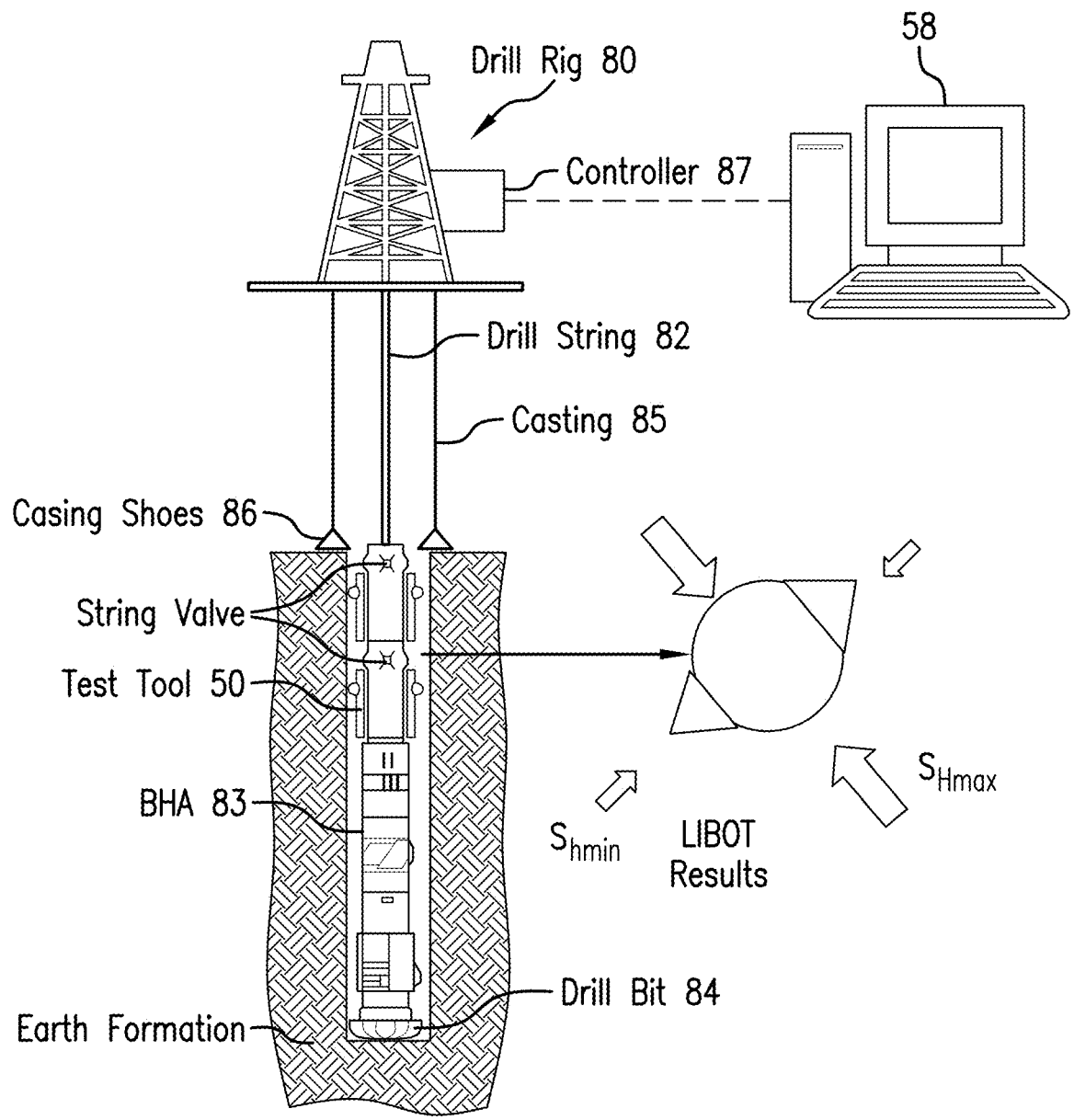
FIG. 8 depicts aspects of vertical drilling and completion.

FIG. 8 depicts aspects of vertical drilling and completion. The borehole 2 is drilled vertical or near-vertical (e.g., +/−10°) using a drill rig 80. The drill rig 80 is configured to drill the borehole 2 by rotating a drill string 82. The drill string 82 includes a bottomhole assembly (BHA) 83 that can include a drill bit 84. A casing 85 is set in the vertical drilled section of the borehole 2. Casing-shoes 86 are at the bottom of the casing 85. Once the casing 85 is set, the borehole 2 is drilled ahead of the cemented casing-shoes 86. The FIT is performed to test the integrity of the casing 85. The LIBOT is performed to determine the directions and/or magnitudes of $S_{hmin}$ and $S_{Hmax}$. One or more string valves may be used to isolate the interior of the drill string 82 for performing the LIBOT. Cuttings can also be analysed to determine magnitudes of $S_{hmin}$ and $S_{Hmax}$. From the magnitudes of $S_{hmin}$ and $S_{Hmax}$, drilling fluid properties and equivalent circulating density (ECD) of the drill fluid can be calculated and set up for drilling ahead of the cemented casing-shoes 86. The ECD is intentionally kept below the fracture pressure and above the pore pressure of the formation exposed to the borehole. In addition, the build direction (i.e., the direction where the borehole starts to deviate from vertical) can be determined from the directions of $S_{hmin}$ and $S_{Hmax}$ in order to decrease the likelihood of damage to the borehole such as by break-outs or collapse. In one or more embodiments, the build direction is in the direction of $S_{hmin}$.

In the embodiment of FIG. 8, the drill rig 80 includes a controller 87. The controller 87 is configured to control one or more drilling parameters used to drill a borehole. In one or more embodiments, one of the drilling parameters is a flow rate of drilling fluid flowing through the drill string 82. In none limiting examples, the flow rate may be controlled by controlling a flow control valve (not shown) through which the drilling fluid flows and/or by controlling a speed of a pump (not shown) that pumps the drilling fluid into the drill string 82. The controller 87 may also be configured to control aspects of the LIBOT such as inflating a packer, decreasing pressure in the annulus section under test, and/or gathering sensor data related to detecting a break-out. Also in the embodiment of FIG. 8, the drill rig 80 includes the computer processing system 58. The computer processing system 58 is configured to process data obtained from the LIBOT.

Figure 9:
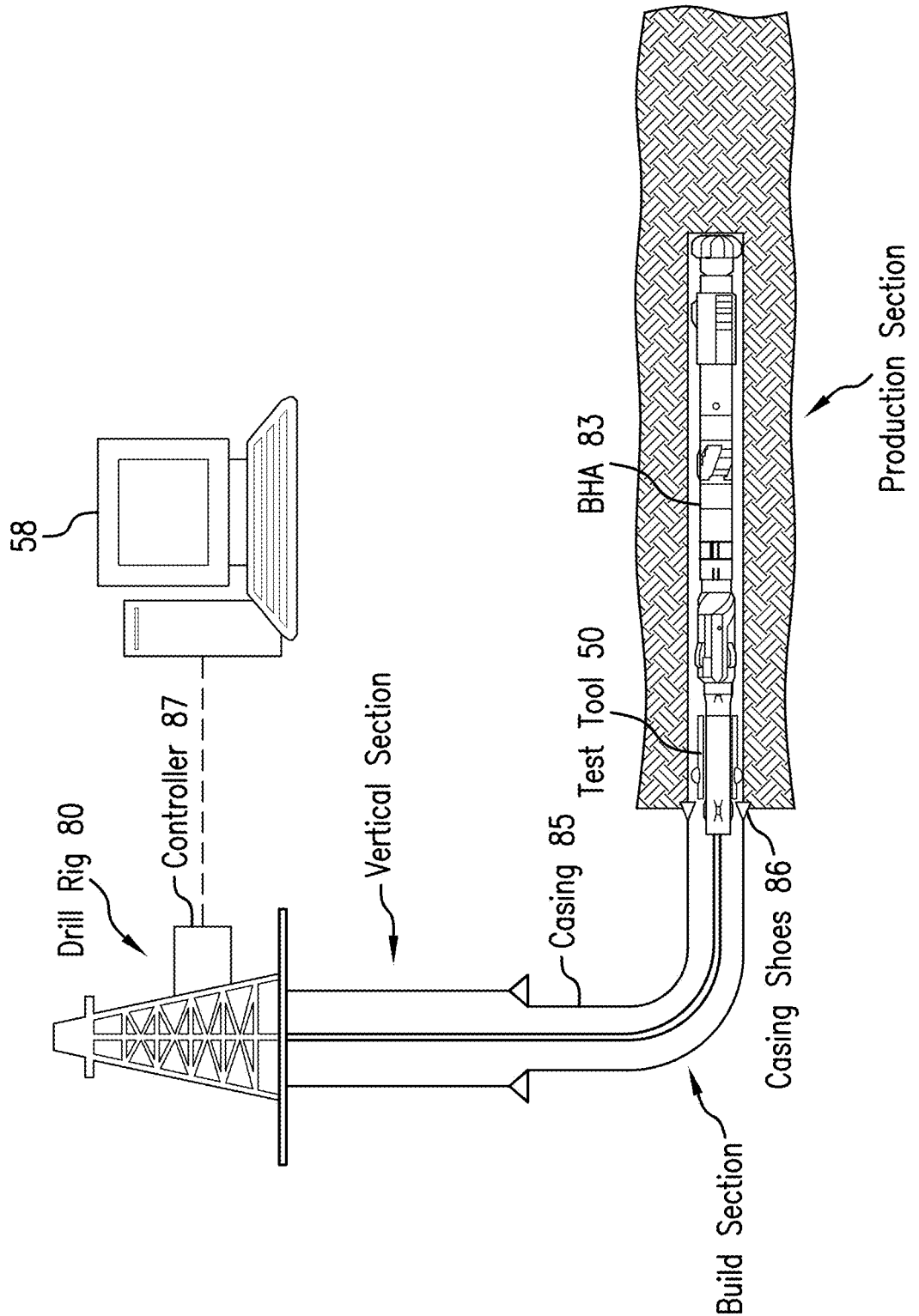
FIG. 9 depicts aspects of build section drilling and completion and a first reservoir test.

FIG. 9 depicts aspects of build section drilling and completion and a first reservoir test. The borehole is drilled in the build section in a selected direction such as the direction of $S_{hmin}$ for example. Next, the casing 85 is set in the build section. Next, the borehole is drilled past the cemented casing-shoes 86 in a production section. Another FIT is performed to test the integrity of the casing 85 in the build section. Another LIBOT is performed to determine directions and/or magnitudes of $S_{hmin}$ and $S_{Hmax}$. Cuttings may also be analyzed to determine magnitudes of $S_{hmin}$ and $S_{Hmax}$. Based on magnitudes of $S_{hmin}$ and $S_{Hmax}$, drilling parameters such as drilling fluid weight and ECD may be re-adjusted. In addition, a model of the formation being drilled may be updated with updated directions and/or magnitudes of $S_{hmin}$ and $S_{Hmax}$.

Figure 10:
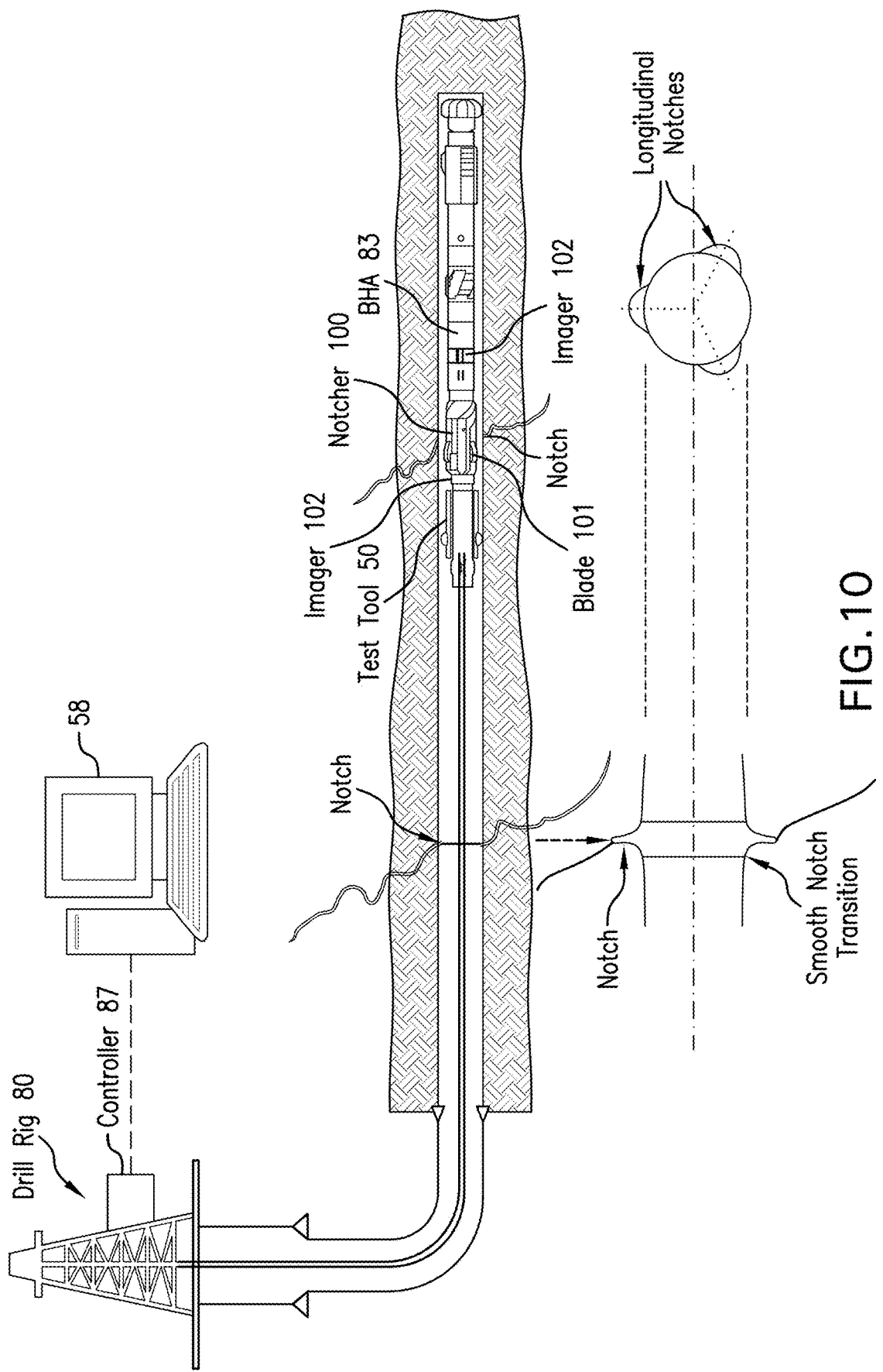
FIG. 10 depicts aspects of notching a wall of a borehole as a drill string is pulled out of the borehole.
Figure 13:
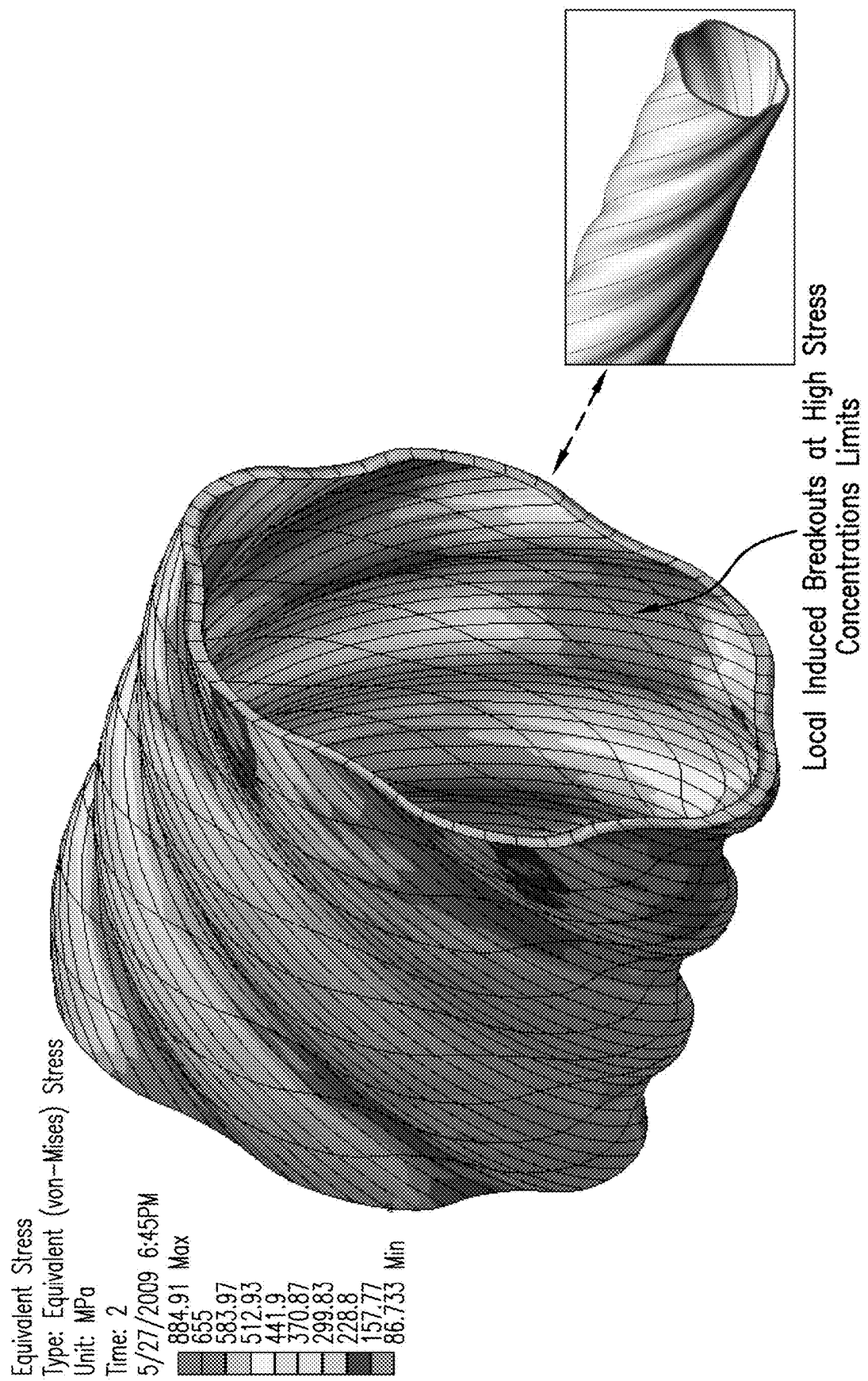
FIG. 13 depicts aspects of a spiral notched wellbore.

FIG. 10 depicts aspects of notching a wall of a borehole as a drill string is pulled out of the borehole. In the embodiment of FIG. 10, the BHA 83 includes a notcher 100. The notcher 100 is configured to notch a wall of the borehole 2 at selected locations such as by remote control. The notcher 100 may include a blade 101 that is configured interact with a wall of the borehole in order to form a notch. In one or more embodiments, the blade is moved by an actuator (not shown) that receives a control signal to extend the blade 101 at the selected locations. In one or more embodiments, the notch can be 180° around the borehole, 360° around the borehole, or some other geometry. The notch is configured to weaken the borehole wall at the selected locations so that the formation at the notches will be fractured when the formation is stimulated such as by hydraulic fracturing or chemical treatment. Notching the formation does thus weaken the rock strength (e.g., tensile, shear and/or compression strength) of the formation so that the FBP does not need to be exceeded during a leak-off test. The stimulation is such that the borehole wall will only be fractured at the notch locations. In one or more embodiments, the notcher 100 is configured to provide notches that have a smooth notch transition to prevent fractures from propagating along the borehole. The smooth notch transitions may be implemented by smooth extension and retraction of the blade 101. The LIBOT data may be used to determine the type of notches to be installed in the selected locations. For example, depth of the notches and smoothness of the transitions may be determined by the orientation and/or magnitude of the various stresses. The BHA 83 may also include one or more imagers 102 to identify locations of notches or a reference point from which the BHA 83 started to be pulled from the borehole or from which the notches started to be installed. Circumferential notching, perpendicular to drilling direction as illustrated in FIG. 10 can be performed by utilization of electrical or mechanical actuated extendable reamer with sufficient one or more blades 101. The blades might have the negative form of the Notch embedded in the cutter geometry of the blades or might form the contour of the Notch and the Smooth Notch Transition by Blade 101 extension observation and control. Longitudinal notching, parallel to drilling direction, may be performed by extension of sufficient blades 101 with cutter elements placed perpendicular to a longitudinal direction and moving the drill string in the longitudinal direction while extending the blades one or more times. Shape and depth of cut of the operation can be observed while notching with BHA embedded sensors. The utilization of BHA embedded modules with rotating cutters (e.g. electrical driven saw blades or ball shaped bits) is an additional opportunity to speed up notching but may increase complexity of the BHA. Any kind of three-dimensional (3D) notch geometry can be worked out on the Inner Diameter of the wellbore with the goal of initiating or relieving defined local stresses in order to derive stress conditions and/or determine productivity of a formation section of interest. Notching is not limited to symmetric circumferential or longitudinal workouts. Notching can be performed with any kind of 3D shapes, e.g. spiral or wave forms as illustrated in FIG. 13 or simple holes/milling contours in one direction of circumference. Notching contours can be pre-defined by utilization of wellbore images, such as those taken in the "Geomonitoring while Drilling" process, block 141 in FIG. 14. In this case a BHA integrated milling tool could enlarge identified natural fractures (e.g. dark lines of wellbore images) in direction of expected maximum horizontal or vertical stress (e.g., see FIGS. 3A and 3B) or in direction of expected minimum horizontal Stress (e.g., see FIG. 5). The advantages of this kind of operation are reduced breakout volume (reduction of pre-damages of the wellbore) and reduction of differential pressure over the packer to observe a break out or fracturing effect. It can be appreciated that different types of notches can be implemented based longitudinal travel and/or rotation of the notcher. For example, a longitudinal notch can be implemented by longitudinal travel of the notcher with the blade extended without rotation of the notcher. A circumferential notch can be implemented by rotation of the notcher with the blade extended without longitudinal travel. A spiral notch can be implemented by longitudinal travel of the notcher while the notcher is rotating with the blade extended. A wave notch can be implemented with longitudinal travel of the notcher with the blade being extended and retracted in a continuous motion. Various other types of notches can be implemented by a combination of the above.

Figure 11:
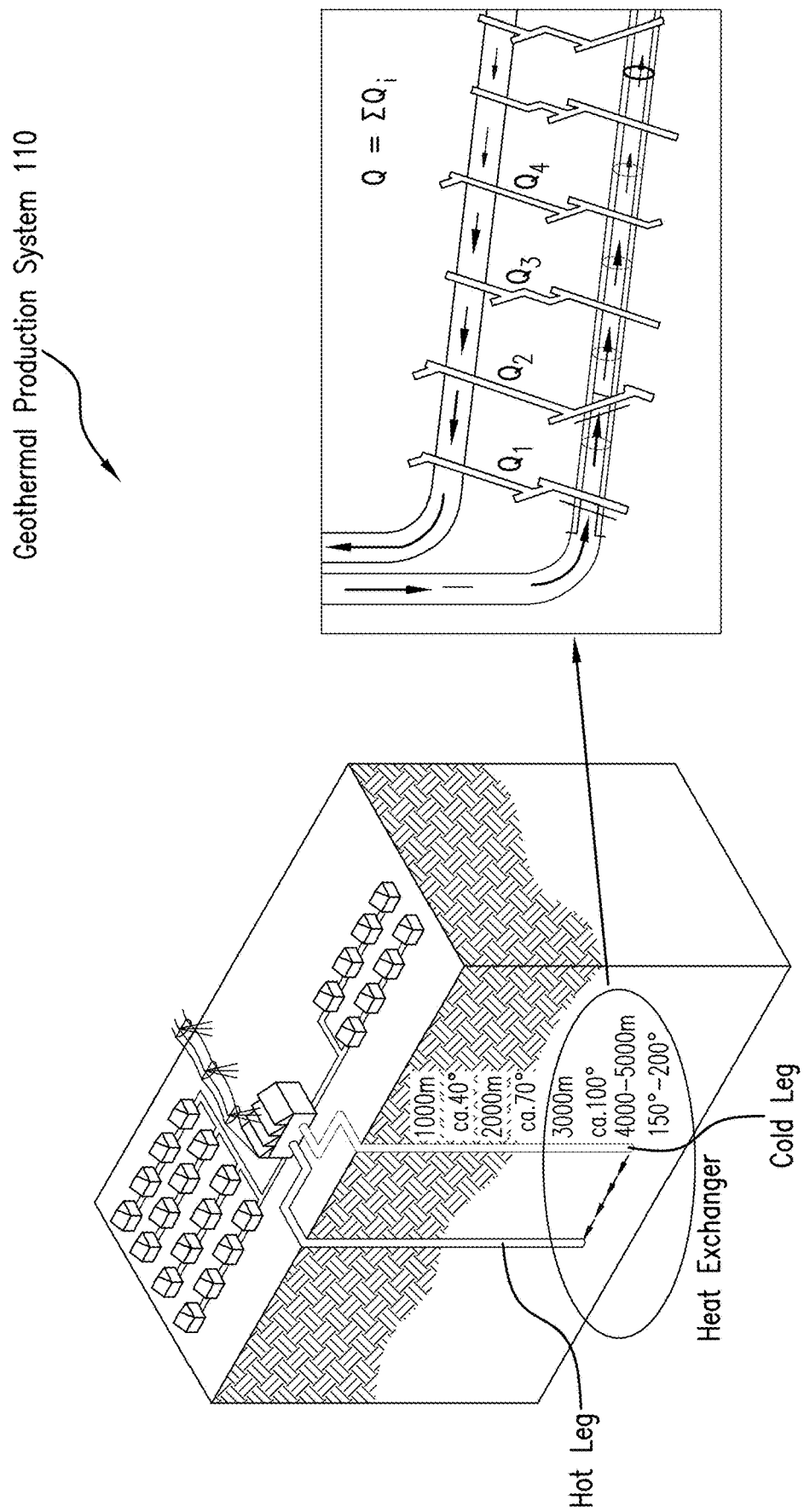
FIG. 11 depicts aspects of a geothermal power system.

There are several advantages to being able to have fractures at selected locations. One advantage is in geothermal power production. In geothermal power production there are generally two boreholes, one for cold water going down into the formation (cold leg) and one for hot water going up to the surface (hot leg). The fractures at the selected locations enable a known or estimated flow rate of water or fluid at each fracture from the cold leg borehole to the hot leg borehole. The cold water flowing through each fracture is heated by the formation. This provides for high efficiency, less cost and predictable performance. See for example, FIG. 11, which depicts aspects of geothermal production 110.

Another advantage relates to hydrocarbon production. By knowing the location of the fractures, screens in production piping can be placed at each fracture. By controlling the flow rate of hydrocarbons into the production piping, the amount of electric power needed to lift the produced hydrocarbons can be determined and match the amount of power available. This also provides for high efficiency, less cost and predictable performance.

Figure 14:
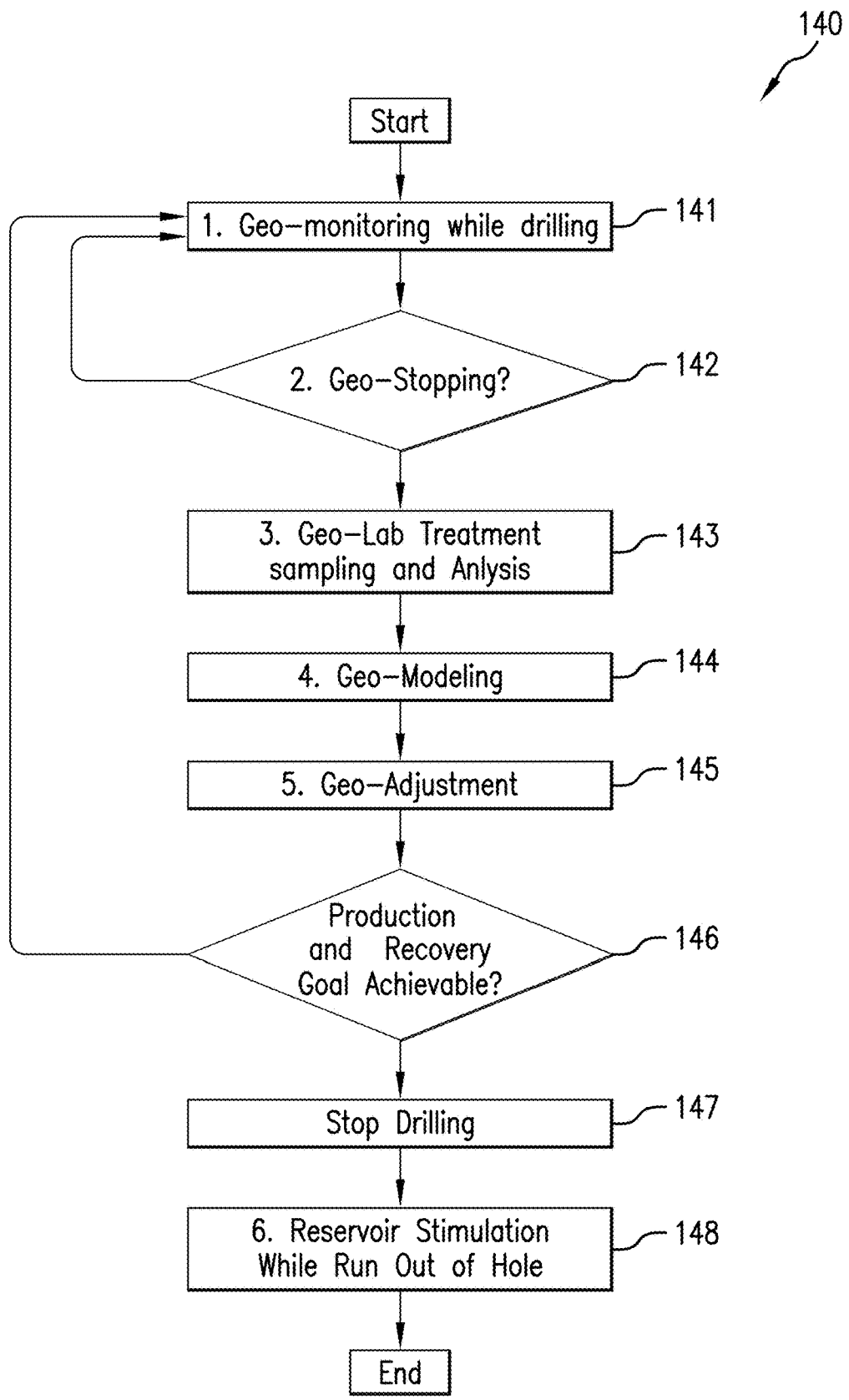
FIG. 14 is a flow chart for a method for performing a reservoir operation.

FIG. 14 is a flow diagram for a method 140 for performing a reservoir (or formation) operation. Block 141 relates to Geo-Monitoring While Drilling. This block may include the following operations and analysis. Drilling a first section of the borehole while drill string monitoring and formation logging. This process step includes first monitoring and processing of a drill process parameter such as Differential Pressure over drill string sections, Weight on Bit (WOB), Torque, Rate of penetration (ROP) and drilling induced vibration to identify change of mechanical properties of the formation to provide a first data set. The first data set can be used to determine the Mechanical Specific Energy (MSE, [MPa]) for rock destruction as well as other data sets to find correlations to offset wells. This process step may also include secondly formation monitoring like Gamma Ray, Resistivity measurement, Density measurement and Geometrical Imaging of the wellbore wall to provide a second data set. The first and second data sets can be utilized to compute and derive Average Rock Strength of the formation while drilling. The resolution over the length of the section drilled depends on data rate of available data transmission systems, computation power and intelligence of the utilized software. Backflow analysis allows the monitoring and analysis of chemical properties of the formation (Gas and Fluids). Online cutting size/shape monitoring and frequent mechanical analysis (e.g. by crushing) can be used to determine Unconfined Compressive Strength (UCS) of the formation at the surface. Inputs for this block may include Drilling Power and Dynamics, logging-while-drilling (LWD) data, Backflow chemicals, cutting strength, and differential pressures of the drill string. Outputs of this block may include Average Mechanical Strength of drilled interval, Updated geological formation model, Updated Wellbore Integrity Model (including Equivalent Circulation Density ECD).

Block 142 relates to Geo-Stopping. This block may include the following operations and analysis. Performing wellbore integrity and formation model risk assessment based on data of Geo-Monitoring and Offset-Well Data. Stop drilling in case of less safety margin according integrity and required stress state information. Inputs for this block may include Average Mechanical Strength of drilled interval, Updated geological formation model, Updated Wellbore Integrity Model (Equivalent Circulation Density ECD), and Offset Well Data. Outputs of this block may include Decision to stop drilling at a defined position and performing local fracturing and/or local induced break out test.

Block 143 relates to Geo-Lab Treatment, Sampling and Analysis. This block may include the following operations and analysis. First, Symmetrical Notching and/or pre-defined local workout of formation material based on Geo-Monitoring data and updated formation model, while monitoring workout/cutting parameter (e.g., RPM, Torque, Reactive Forces) with the goal to generate defined stress relieved or weakened areas. Second, set sealing elements (e.g., Packer) between formation and drill string, to enable local (e.g., length of 3 feet) pressure decrease or increase application over the workout area. Third, performing local in situ stress state analysis by increasing or decreasing pressure within the sealed section while monitoring, pressure, flow rate, shape and direction of fractures or breakouts (e.g., breakout angle, breakout shape, fracture surface, fracture depth). Fourth, Determination of Stress State by analysis of monitored data, including determination of minimum horizontal stress by e.g. via shut in pressure and determination of direction of minimum horizontal stress direction by break out position. Inputs for this block may include Geo-Monitoring data and updated formation model. Outputs for this block may include Local Stress States, Minimum Horizontal Stress, Minimum Horizontal Stress Direction, Fracturing Pressures, Fracture Volume, Fracture depth, Shape of Breakouts and Fractures (all static or dynamic depending on capability of the monitoring systems).

Block 144 relates to Geo-Modelling. This block may include Update of local (investigated section) and global formation model based on local stress state analysis and Calculation of Stress state based on Geo-Monitoring and Geo-Lab data. Inputs for this block may include Average Mechanical Strength of drilled interval, Updated geological formation model, Updated Wellbore Integrity Model (Equivalent Circulation Density ECD), Physical and Chemical properties of the formation, Local Stress States, Minimum Horizontal Stress, Minimum Horizontal Stress Direction, Fracturing Pressures, Fracture Volume, Fracture depth, Shape of Breakouts and Fractures (all static or dynamic depending on capability of the monitoring systems). Outputs for this block may include Global Stress State, Local Stress State with higher accuracy, Maximum Horizontal Stress, Maximum Horizontal Stress Direction, and other stresses or stress states.

Block 145 relates to Geo-Adjustment. This block may include Drilling of a second section of the borehole according derived stress state and formation fracturing parameter and Calculation of Fracture staging and productivity. Inputs for this block may include Global Stress State, Local Stress State with higher accuracy, Maximum Horizontal Stress, Maximum Horizontal Stress Direction, and other stresses or stress states. Outputs for this block may include Low Risk Drilling (less non-productive time), Production optimized Well Path, Enabling of open hole completions, Stress State of Exploration wells or wells with changing stress state, Fracturing Parameter for maximum recovery and to achieve production goal.

Block 146 relates to determining if production and recovery goal is achievable. If achievable, then proceed to block 147, which relates to Stop Drilling.

Block 148 relates to Geo-Stimulation while Drilling. This block may include changing drilling fluid to fracturing fluid and open hole stimulation of identified fracturing zones while running drill string out of hole. Notcher can be used to enlarge and/or ream and/or notch identified fracture sections and/or remove filter cake.

One example of a method for drilling a borehole penetrating an earth formation. A first stage calls for drilling a first section of the borehole using a drill string. In one or more embodiments, the drill string is operated by a drill rig. In one or more embodiments, the first section is substantially vertical.

A second stage calls for notching a wall of the borehole in one or more selected locations with a selected type of notch using a notcher disposed on the drill string for defined local weakening of the formation. Non-limiting embodiments of the type of notch include circumferential, longitudinal, spiral, and/or wave.

A third stage calls for performing a local induced break-out test (LIBOT) and/or local fracturing operation on an annulus section of the first section of the borehole between the drill string and a wall of the borehole using a test tool having a packer to provide formation stress-state data, the test tool being disposed on the drill string and the packer being configured to isolate the annulus section. The formation stress-state data can be used to determine the one or more selected locations for notching the wall of the borehole.

A fourth stage calls for deriving stress-state of the formation and a fracturing parameter of the formation using the formation stress-state data. This stage may be implemented by a processor.

A fifth stage calls for drilling a second section of the borehole using the derived stress-state and the fracturing parameter. In one or more embodiments, a controller is used to control a drilling direction of the drill string for drilling the second section of the borehole in a selected direction using the derived stress-state and the fracturing parameter.

Set forth below are some embodiments of the foregoing disclosure:

Embodiment 1

A method for drilling a borehole penetrating an earth formation, the method comprising: drilling a first section of the borehole using a drill string; notching a wall of the borehole in one or more selected locations with a selected type of notch using a notcher disposed on the drill string for defined local weakening of the formation; performing a local induced break-out test (LIBOT) and/or local fracturing operation on an annulus section of the first section of the borehole between the drill string and a wall of the borehole using a test tool comprising a packer to provide formation stress-state data, the test tool being disposed on the drill string and the packer being configured to isolate the annulus section; deriving stress-state of the formation and a fracturing parameter of the formation using the formation stress-state data; and drilling a second section of the borehole using the derived stress-state and the fracturing parameter; wherein the one or more selected locations is based upon the formation stress-state data.

Embodiment 2

The method according to any prior embodiment, wherein the local induced break-out test comprises: inflating the packer; decreasing pressure in the annulus section; detecting a break-out in a wall of the borehole using a sensor to provide a direction of the break-out; and sensing pressure in the isolated annulus when the break-out is detected using a pressure sensor to provide a break-out pressure.

Embodiment 3

The method according to any prior embodiment, wherein the formation stress-state data comprises a direction of the break-out in the wall of the borehole.

Embodiment 4

The method according to any prior embodiment, further comprising estimating with a processor a direction of a maximum horizontal stress and a minimum horizontal stress using the direction of the break-out.

Embodiment 5

The method according to any prior embodiment, wherein drilling the second section of the borehole using the derived stress-state and the fracturing parameter data is based upon the direction of the maximum horizontal stress and the minimum horizontal stress.

Embodiment 6

The method according to any prior embodiment, wherein the LIBOT further comprises a break-out pressure.

Embodiment 7

The method according to any prior embodiment, further comprising estimating a magnitude of the maximum horizontal stress and the minimum horizontal stress using the break-out pressure.

Embodiment 8

The method according to any prior embodiment, further comprising adjusting a drilling parameter used in drilling the second section based upon the magnitude of the maximum horizontal stress and the minimum horizontal stress using a controller.

Embodiment 9

The method according to any prior embodiment, wherein the first section of the borehole comprises a substantially vertical section.

Embodiment 10

The method according to any prior embodiment, wherein the second section of the borehole comprises a build section of the borehole.

Embodiment 11

The method according to any prior embodiment, wherein the one or more locations are in a production section of the borehole.

Embodiment 12

The method according to any prior embodiment, wherein the production section is configured to produce geothermal power and the one or more locations are configured to be fractured to connect with another borehole.

Embodiment 13

The method according to any prior embodiment, wherein the production section is configured to produce hydrocarbons and the one or more locations are configured to be fractured to produce the hydrocarbons at the one or more locations.

Embodiment 14

The method according to any prior embodiment, wherein the packer comprises a first packer and a second packer that are configured to isolate the annulus section.

Embodiment 15

The method according to any prior embodiment, wherein the annulus section is isolated by the packer at one end and an end of borehole at the other end.

Embodiment 16

The method according to any prior embodiment, further comprising updating an entire reservoir formation model using the formation stress-state data.

Embodiment 17

The method according to any prior embodiment, further comprising performing a final reservoir stimulation while drilling operation based on evaluated and computed stress state of the reservoir and local fracture productivity.

Embodiment 18

An apparatus for drilling a borehole penetrating an earth formation, the apparatus comprising: a drill string configured to drill a first section and a second section of the borehole; a notcher disposed on the drill string and configured to notch a wall of the borehole in one or more selected locations with a selected type of notch for defined local weakening of the formation; a test tool comprising a packer disposed on the drill string, the test tool being configured to perform a local induced break-out test (LIBOT) and/or local fracturing operation on an annulus section of the first section of the borehole between the drill string and a wall of the borehole to provide formation stress-state data, the packer being configured to isolate the annulus section; a processor configured to derive a stress-state of the formation and a fracturing parameter of the formation using the formation stress-state data; and a controller configured to control a drilling direction of the drill string for drilling the second section of the borehole in a selected direction using the derived stress-state and the fracturing parameter; wherein the one or more selected locations is based upon the formation stress-state data.

Embodiment 19

The apparatus according to any prior embodiment, wherein the controller is further configured to control one or more drilling parameters for drilling the second section of the borehole based upon the formation stress-state data.

Embodiment 20

The apparatus according to any prior embodiment, wherein the one or more drilling parameters comprises a flow rate of drilling fluid flowing through the drill string.

Embodiment 21

The apparatus according to any prior embodiment, wherein the test tool is configured to: inflate the packer; decrease pressure in the annulus section; detect the break-out in the wall of the borehole using a sensor to provide a direction of the break-out; and sense pressure in the isolated annulus when the break-out is detected using a pressure sensor to provide a break-out pressure.

Embodiment 22

The apparatus according to any prior embodiment, wherein the formation stress-state data comprises a direction of the break-out in the wall of the borehole and the apparatus further comprises a processor configured to estimate a direction of a maximum horizontal stress and a minimum horizontal stress using the direction of the break-out.

In support of the teachings herein, various analysis components may be used, including a digital and/or an analog system. For example, the computer system 58, the downhole electronics 59, and/or the controller 87 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For example other operations such as cooling may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for constructing a borehole penetrating a formation, the method comprising:
   drilling a first section of the borehole using a drill string coupled to a test tool;
   notching the formation to form a notch using a notcher disposed on the drill string;
   changing pressure at the notch using a pump in fluid communication with the notch and disposed in the first section of the borehole, wherein the pump is disposed in the test tool;
   detecting a change of the notch using a sensor disposed on the test tool to provide sensor data; and
   drilling a second section of the borehole with the drill string using the sensor data to construct the borehole;
   wherein the sensor data is obtained with one run of the test tool through the first section of the borehole.

2. The method according to claim 1, further comprising:
   inflating a packer disposed on the test tool and proximate to the notch to isolate the notch in an annulus section;
   wherein: the changing comprises decreasing pressure in the annulus section; and
   the detecting comprises detecting a break-out in a wall of the borehole using a sensor to provide a direction of the break-out; and
   sensing pressure in the isolated annulus when the break-out is detected using a pressure sensor disposed on the test tool to provide a break-out pressure.

3. The method according to claim 2, wherein the sensor data comprises a direction of the break-out in the wall of the borehole.

4. The method according to claim 3, further comprising estimating with a processor a direction of a maximum horizontal stress and a minimum horizontal stress using the direction of the break-out.

5. The method according to claim 4, wherein drilling a second section of the borehole using the sensor data is based upon the direction of the maximum horizontal stress and the minimum horizontal stress.

6. The method according to claim 4, further comprising estimating a magnitude of the maximum horizontal stress and the minimum horizontal stress using the break-out pressure.

7. The method according to claim 6, further comprising adjusting a drilling parameter used in drilling the second section of the borehole based upon the magnitude of the maximum horizontal stress and the minimum horizontal stress using a controller.

8. The method according to claim 2, wherein the packer comprises a first packer and a second packer that are configured to isolate the annulus section.

9. The method according to claim 2, wherein the annulus section is isolated by the packer at one end and an end of borehole at the other end.

10. The method according to claim 1, wherein the notch is in a substantially vertical section of the borehole.

11. The method according to claim 1, wherein the constructed borehole comprises a build section.

12. The method according to claim 1, wherein the notch is in a production section of the borehole.

13. The method according to claim 12, wherein the production section is configured to produce geothermal power and a location of the notch is configured to be fractured to connect with another borehole.

14. The method according to claim 12, wherein the production section is configured to produce hydrocarbons and a location of the notch is configured to be fractured to produce the hydrocarbons.

15. The method according to claim 1, further comprising updating an entire reservoir formation model using stress-state data derived from the sensor data.

16. The method according to claim 1, further comprising performing a reservoir stimulation while drilling operation to fracture only the notch based on not exceeding formation breakdown pressure (FBP) as derived from the sensor data.

17. The method according to claim 1, deriving at least one of formation stress information and formation fracturing information using the sensor data.

18. The method according to claim 17, wherein drilling a second section of the borehole comprises using at least one of the formation stress information and the formation fracturing information.

19. The method according to claim 1, wherein notching comprises using the notcher to form a selected type of notch.

20. The method according to claim 1, further comprising performing a local induced break-out test (LIBOT) on the formation using the test tool.

21. The method according to claim 1, wherein detecting a change of the notch using a sensor to provide sensor data comprises imaging the notch over time and transmitting image data to a surface processing system.

22. The method according to claim 1, further comprising performing a local fracturing test operation on the formation using the test tool.

23. An apparatus for constructing a borehole penetrating a formation, the apparatus comprising:
   a drill string configured to drill a first section and a second section of the borehole;

a notcher disposed on the drill string and configured to notch the formation to form a notch;

a test tool coupled to the drill string and disposed in the first section of the boreholes;

a pump disposed in the test tool and in fluid communication with the notch, the pump being configured to change pressure at the notch;

a sensor disposed on the test tool and configured to detect a change of the notch to provide sensor data with one run of the test tool through the first section of the borehole; and a drill rig configured to operate the drill string to construct the second section of the borehole using the sensor data.

24. The apparatus according to claim 23, further comprising a controller configured to control one or more parameters for constructing the borehole based upon the sensor data.

25. The apparatus according to claim 24, wherein the one or more parameters comprises a flow rate of drilling fluid flowing through the drill string.

26. The apparatus according to claim 23, wherein the tool is configured to:

inflate a packer disposed on the test tool and proximate to the notch to isolate an annulus section;

decrease pressure in the annulus section;

detect the break-out in the wall of the borehole using the sensor to provide a direction of the break-out; and sense pressure in the isolated annulus when the break-out is detected using a pressure sensor disposed on the test tool to provide a break-out pressure.

27. The apparatus according to claim 23, wherein the sensor data comprises a direction of the break-out in the wall of the borehole and the apparatus further comprises a processor configured to estimate a direction of a maximum horizontal stress and a minimum horizontal stress using the direction of the break-out.

* * * * *